(No Model.)  4 Sheets—Sheet 1.
D. LUBIN.
CLOD CRUSHER.
No. 357,844. Patented Feb. 15, 1887.
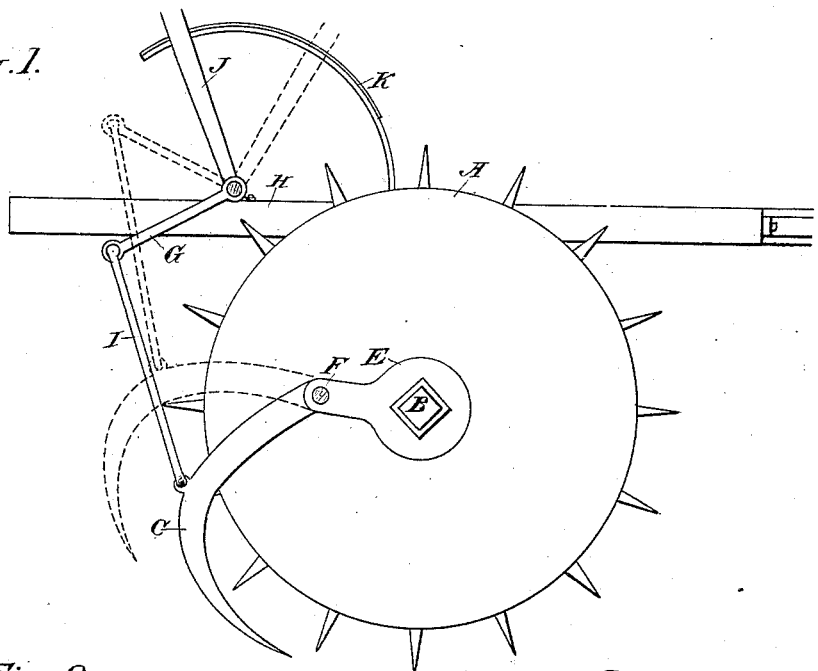
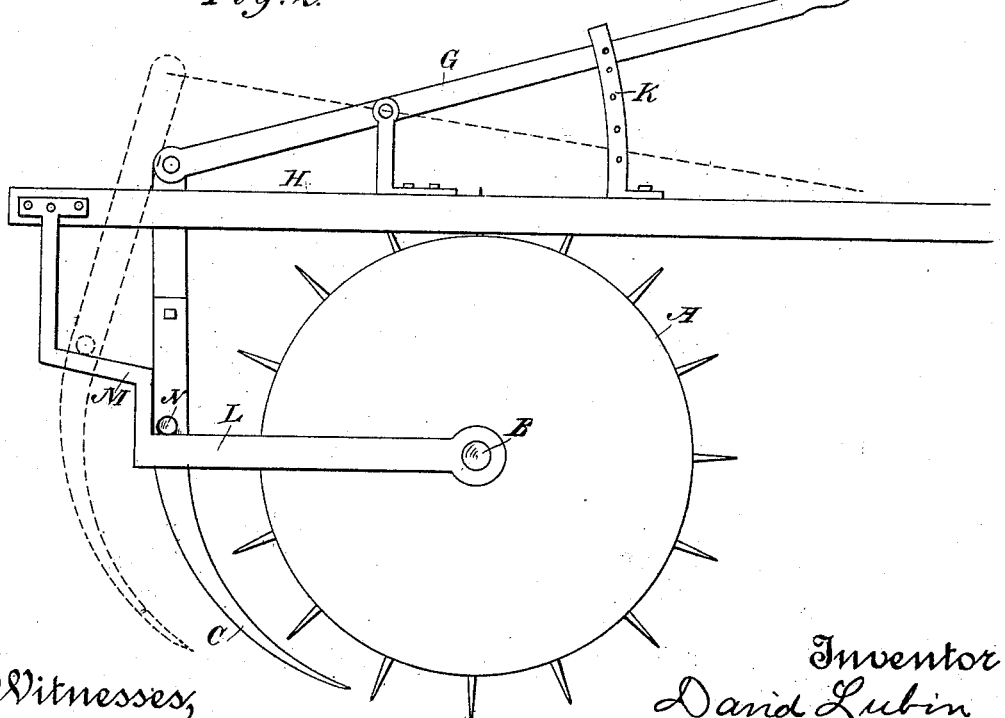
Witnesses,
Geo. H. Strong.
J. L. Rouse.
Inventor,
David Lubin
By Dewey & Co.
attys (No Model.) 4 Sheets—Sheet 2.

D. LUBIN.
CLOD CRUSHER.

No. 357,844. Patented Feb. 15, 1887.

Witnesses,
Geo. H. Strong.

Inventor,
David Lubin
By Dewey & Co.
Attys (No Model.) 4 Sheets—Sheet 3.

D. LUBIN.
CLOD CRUSHER.

No. 357,844. Patented Feb. 15, 1887.

Witnesses,
Geo. H. Strong.

Inventor,
David Lubin
By Dewey & Co.
attys (No Model.) 4 Sheets—Sheet 4.
D. LUBIN.
CLOD CRUSHER.

No. 357,844. Patented Feb. 15, 1887.

Witnesses,
Geo. H. Strong.
J. H. Towne.

Inventor,
David Lubin
By
Dewey & Co.
Attys

United States Patent Office.

DAVID LUBIN, OF SACRAMENTO, CALIFORNIA.

CLOD-CRUSHER.

SPECIFICATION forming part of Letters Patent No. 357,844, dated February 15, 1887.

Application filed November 12, 1886. Serial No. 218,731. (No model.)

*To all whom it may concern:*

Be it known that I, DAVID LUBIN, of Sacramento, Sacramento county, State of California, have invented an Improvement in Clod-Crushers; and I hereby declare the following to be a full, clear, and exact description of the same.

My invention relates to certain improvements in devices for crushing or pulverizing the earth; and it consists of a series of disks, either plane or toothed, mounted upon a horizontal axle, and, in combination with these, of a series of arms or fingers projecting down in front of or behind the vertical plane of the axle, so that their points will enter the ground, and at the same time serve in connection with the teeth or edges of the disks to crush and break the clods which may be taken up by these fingers. Connected with these fingers is a mechanism, either automatic or otherwise, by which the teeth may be raised out of the ground or disengaged, so as to clear them of stones, trash, or other obstructions which may be picked up as the machine travels, and afterward returned to the working position.

Figure 3:
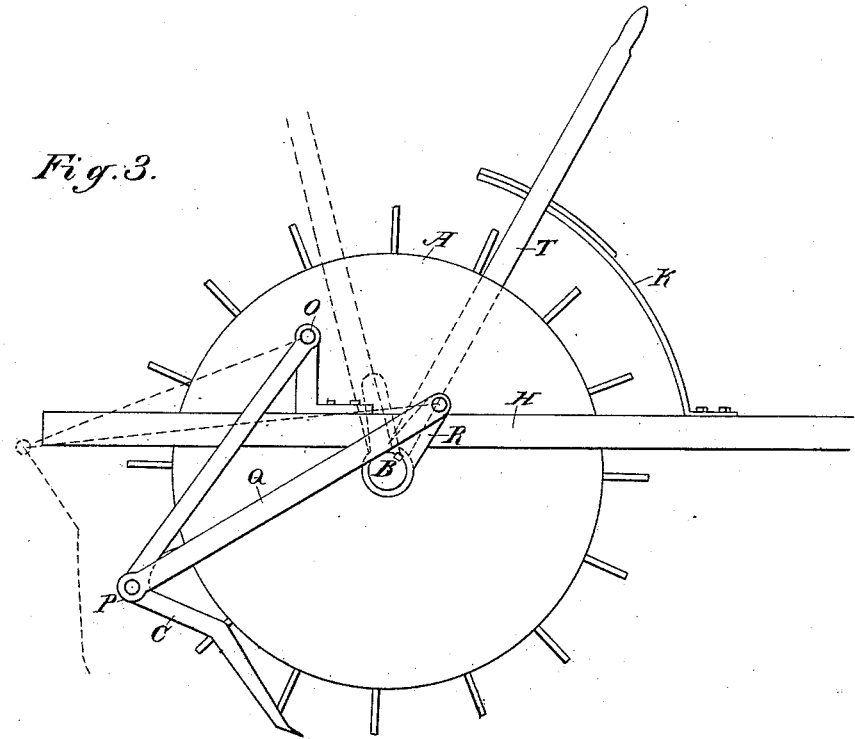
Figure 4:
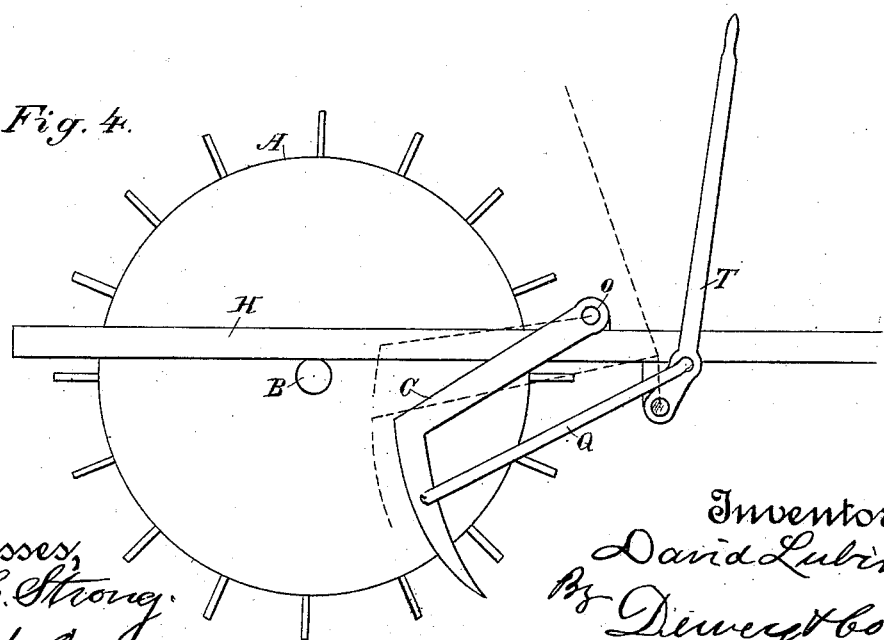
Figure 5:
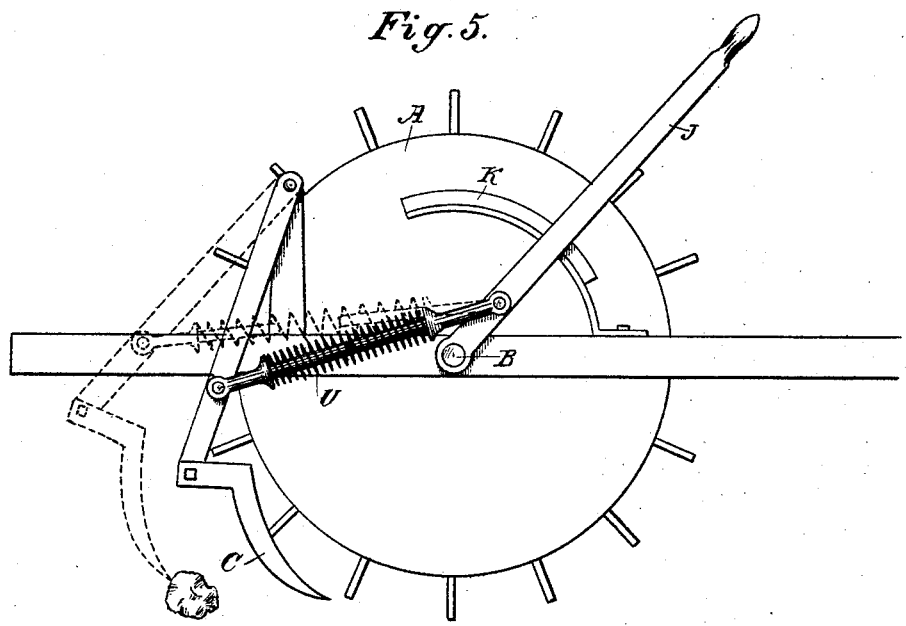
Figure 6:
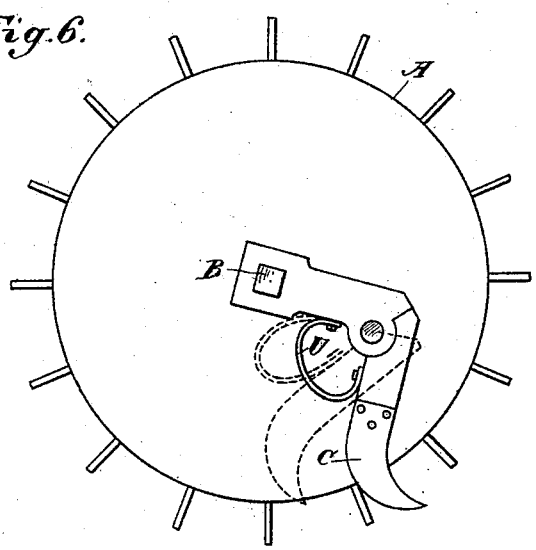
Figure 7:
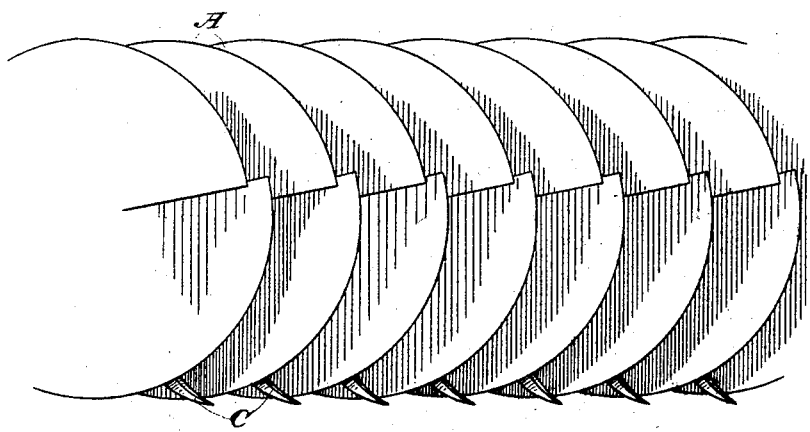

Referring to the accompanying drawings for a more complete explanation of my invention, Figure 1 is a view of my apparatus, showing one device for raising and depressing the fingers. Figs. 2 and 3 are modifications producing the same result. Fig. 4 shows the fingers in front of the disks. Figs. 5 and 6 show the fingers arranged to operate automatically. Fig. 7 is a view showing the spiral disks.

A are disks or rollers having teeth projecting radially from their peripheries, these disks being mounted upon an axle, B, so as to stand at a suitable distance apart, usually about four inches.

C are pointed arms, which extend downward either in front of or behind the row of disks or the axle, and so that their points may enter the ground between the planes of the peripheries of the disks, and they will take up or hold any clods or lumps of earth, so that the teeth of the revolving disks will crush these clods or lumps between themselves and the arms C, as described in former applications for patents made by me. Whenever any stone, stick, or large obstruction, weeds or other trash, are picked up, so as to clog the apparatus, it is necessary and desirable to raise these fingers out of the ground, so as to clear them of the obstruction. I have found some difficulty in properly clearing them of obstructions when the fingers turn about the axle B as a common center with the disks, and my present construction is intended to remedy this difficulty. This is done by placing the fulcrums or pivots of the fingers at points away from the line of the axis of the disks, so that when the fingers are turned about these fulcrums they will be lifted from the ground and at the same time turned about their centers of motion, so as to move away from the teeth or edges of the disks and open a space for the ready clearance of the fingers. This may be accomplished in various ways, either by means of levers operated by an attendant, or preferably by an automatic device, which I shall hereinafter describe.

In Fig. 1 I have shown plates E, secured to a stationary axle about which the disks revolve, these plates having lugs or projections F, perforated so as to receive pins, by which the curved arms or fingers C are pivoted or hinged to them. As the pivot-pin about which these fingers turn is at one side of the center of the axle, it will be manifest that when the fingers are forced down into the ground they will be drawn toward the periphery of the disks; but when they are raised upward and backward they will also be carried away from the periphery of the disks, thus allowing them to clear themselves of any obstructions. In order to raise and lower these fingers and hold them in the proper position, I have shown in Fig. 1 a lever-arm, G, having one end fulcrumed or journaled upon the frame H of the machine and the other end connected by a link, I, with the fingers C at a point sufficiently far from the fulcrum F so that it may be raised or depressed about that fulcrum by the movement of the lever G, and when this lever G is held in any desired position it acts as a lock to hold the tooth in its proper relative position.

J is a hand-lever fixed to the same shaft with the lever G and forming a continuation of it, so that by moving the lever J the lever G may be raised or depressed to actuate the fingers C.

K is a rack with which the pawl on the lever J may be engaged, so as to hold it and the lever G in any desired position. When the fingers are entering the ground in their proper position for work, the lever J will stand as shown in the plain lines of Fig. 1; but when the fingers are to be raised out of the ground the parts will occupy the positions relatively shown in the dotted lines.

In Fig. 2 I have shown a modification, in which the fingers C are continued upward behind the rollers of disks and above the frame H, and have their upper ends connected with a lever or levers, G, which are supported upon a fulcrum-standard on the frame, and this lever extends forward and is engaged by a curved rack, K, so as to hold it in any desired position. In this case I have shown an angular frame-work, L, one end of which is journaled upon or loosely connected with the axle of the disks A between them, while the other end is secured to the beam or frame H, as shown.

A rectangular bend is made at M, and the fingers C are united by a bar, N, which extends through the whole of them at such a point that it will rest against the vertical portion of the rectangle M, and thus hold the fingers in proper position with relation to the disks when they are at work.

If it is desired to release the fingers and allow them to move backward, it is done by simply throwing the lever G down, thus raising the rear end, and with it the fingers, until the bar N is above the vertical portion of the rectangle M, when it will slip backward into the position shown in the dotted lines of Fig. 2, thus relieving the teeth of any clogging material. In Fig. 3 I have shown still another construction of mechanism for producing the same result. In this case the fingers C are bent or curved so that the upper ends extending above the frame H will be fulcrumed to a stationary standard, as shown at O. From the angle P of these fingers a connecting rod or lever, Q, extends forward between the disks A, and its inner end is connected with a crank-arm, R, which is keyed to the axle B, as shown. To the end of this axle, which in this case may be rotated, is fitted a lever, T, which extends upward within easy reach of the operator, and a rack, K, serves to hold it in any desired position, the fingers being in the ground, as shown by the plain lines of Fig. 3. If it is desired to throw them out of the ground to relieve them of clogging material, it is done by throwing the lever T back, as shown in the dotted lines, when the action of the crank-arm R, the connecting-rod Q, and the fingers C, suspended or fulcrumed at O, will be to throw the fingers up, as shown in the dotted lines. In Fig. 4 I have shown a similar construction with the fingers standing in front of the disks, as in my former applications. It may, however, be preferable to operate the fingers automatically, because many delays may be thus avoided which would have to be made with any arrangement of levers. In order to do this it is necessary to so mount and connect the fingers that they will clear obstructions by simply turning backward about their hinge or fulcrum-points.

Figs. 5 and 6 show this construction, in which the fingers are fulcrumed or hinged, as before described, and they are drawn forward and held in place by means of stout springs U, one of which in Fig. 5 is illustrated as being coiled around a two-part rod, while in Fig. 6 a flat spring is shown. In either case these springs are designed to have one end either directly or indirectly, attached to or pressing against the fingers and the other attached to the frame of the machine or to a lever or other device by which the tension may be regulated. It will be seen, with this construction, that when any one or more of the fingers become clogged or strike an obstruction the tension of the spring or springs will be overcome and the finger will swing backward about its fulcrum until it is clear, when the spring will bring it back to its original position.

Various other modifications may be made of this mechanism which will produce essentially the same result, the fingers being in each case raised or thrown out of the ground or turned back and away from the disks, so as to clear them of obstructions. It will be understood that the disks in this case may be provided with teeth, or they may be corrugated or formed spirally, or constructed as described in my former applications, and the device may also be used with or without a seeder.

In Fig. 7 I have shown the disks formed with spiral blades which act as planes as they rotate, and with these I shall use any form of fingers desirable, either with or without a seeder, or with any arrangement of harrow or cultivator before or behind.

Having thus described my invention, what I claim as new, and desire to secure by Letters Patent, is—

1. The combination, with spiked wheels or disks mounted upon a horizontal axis, of the crushing-fingers having fulcrums distant from the axis of the wheels or disks, and either in front of or behind the vertical plane of the same, and levers by which the fingers are raised from the ground, and at the same time thrown backward from the wheels or disks, substantially as herein described.

2. In a clod crusher or pulverizer, the hinged fingers extending downward between the planes of disks mounted upon a horizontal shaft, in combination with springs, the tension of which is overcome by obstructions to allow the fingers to turn backward, said springs returning the fingers automatically to their places after the obstruction has been passed, substantially as herein described.

3. The combination, with the spiked wheels or disks, of the fingers against which the clods are crushed, the springs or elastic connections, as shown, and the levers for regulating the tension or moving the fingers independently of the springs, substantially as described.

4. The rotating disks or plows and the crushing-fingers in front of or behind the same and projecting downward between the planes of the disks, in combination with operating-levers, by which the fingers are raised from the ground and at the same time thrown beyond the disks, thereby clearing themselves, substantially as herein described.

In witness whereof I have hereunto set my hand.

DAVID LUBIN.

Witnesses:
S. H. NOURSE,
H. C. LEE.